(12) United States Patent
Ferguson et al.

(10) Patent No.: US 8,090,644 B2
(45) Date of Patent: Jan. 3, 2012

(54) MODELING FINANCIAL INSTRUMENTS USING BID AND ASK PRICES

(75) Inventors: Ralph Bruce Ferguson, Round Rock, TX (US); Liam Cheung, St. Lambert (CA); Ronald Scott Boyd, Austin, TX (US)

(73) Assignee: Penson Worldwide, Inc, Dallas, TX (US)

( * ) Notice: Subject to any disclaimer, the term of this patent is extended or adjusted under 35 U.S.C. 154(b) by 429 days.

(21) Appl. No.: 12/418,951

(22) Filed: Apr. 6, 2009

(65) Prior Publication Data

US 2009/0192949 A1 Jul. 30, 2009

Related U.S. Application Data

(62) Division of application No. 11/263,508, filed on Oct. 31, 2005, now Pat. No. 7,542,939.

(51) Int. Cl.
*G06Q 40/00* (2006.01)
(52) U.S. Cl. .................. 705/37; 705/35; 705/39
(58) Field of Classification Search .......... 705/35, 705/37, 39
See application file for complete search history.

(56) References Cited

U.S. PATENT DOCUMENTS

| | | | |
|---|---|---|---|
| 5,563,607 A | 10/1996 | Loomis et al. | |
| 5,787,402 A | 7/1998 | Potter et al. | |
| 5,867,488 A | 2/1999 | Derango et al. | |
| 6,272,474 B1 | 8/2001 | Garcia | |
| 6,643,631 B1 | 11/2003 | Heyde | |
| 6,677,858 B1 | 1/2004 | Faris et al. | |
| 6,735,580 B1 | 5/2004 | Li et al. | |
| 6,772,132 B1 | 8/2004 | Kemp, II et al. | |
| 6,772,136 B2 | 8/2004 | Kant et al. | |
| 6,829,590 B1 | 12/2004 | Greener et al. | |
| 6,903,681 B2 | 6/2005 | Faris et al. | |
| 6,912,511 B1 | 6/2005 | Eliezer et al. | |
| 6,952,683 B1 | 10/2005 | Gerhard | |
| 6,957,191 B1 | 10/2005 | Belcsak et al. | |
| 6,968,316 B1 * | 11/2005 | Hamilton | 705/36 R |
| 7,035,246 B2 | 4/2006 | Taylor | |
| 7,065,500 B2 | 6/2006 | Singh et al. | |

(Continued)

FOREIGN PATENT DOCUMENTS

JP 2001 125 964 5/2001

(Continued)

OTHER PUBLICATIONS

Written Opinion of the International Searching Authority for of PCT/US2006/42158, Mailed Sep. 5, 2007.

(Continued)

*Primary Examiner* — Jagdish Patel
(74) *Attorney, Agent, or Firm* — RatnerPrestia (57) ABSTRACT

A method for modeling an investment significant parameter of a financial instrument, using a computer. At least one series of historical bid prices of the financial instrument or historical ask prices of the financial instrument is provided. A financial model type that has at least one variable parameter is selected. The variable parameter(s) of the selected financial model type is initialized. The series of historical bid prices and/or historical ask prices is applied to the initialized financial model type to estimate the variable parameter(s). The resulting model of the financial instrument may be used to predict future values of the investment significant parameter of the financial instrument. These predicted future values may be used to determine whether to perform automated trades of the financial instrument.

11 Claims, 3 Drawing Sheets

U.S. PATENT DOCUMENTS

| | | | |
|---|---|---|---|
| 7,080,160 | B2 | 7/2006 | Cognet et al. |
| 7,167,838 | B1 | 1/2007 | Gatto |
| 7,174,340 | B1 | 2/2007 | Molesky et al. |
| 7,177,833 | B1 | 2/2007 | Marynowski et al. |
| 7,197,484 | B1 | 3/2007 | Yuyama |
| 7,467,108 | B2 * | 12/2008 | Papka ................... 705/36 R |
| 7,542,939 | B2 | 6/2009 | Ferguson et al. |
| 2001/0037454 | A1 | 11/2001 | Botti et al. |
| 2002/0055901 | A1 | 5/2002 | Gianakouros et al. |
| 2002/0087454 | A1 | 7/2002 | Calo et al. |
| 2002/0091624 | A1 | 7/2002 | Glodjo et al. |
| 2002/0120837 | A1 | 8/2002 | Maxemchuk et al. |
| 2002/0131370 | A1 | 9/2002 | Chuah et al. |
| 2003/0041006 | A1 | 2/2003 | Bunda |
| 2003/0088499 | A1 | 5/2003 | Gilbert et al. |
| 2003/0149603 | A1 | 8/2003 | Ferguson et al. |
| 2003/0208430 | A1 | 11/2003 | Gershon |
| 2004/0098334 | A1 | 5/2004 | Brusso et al. |
| 2004/0133506 | A1 | 7/2004 | Glodjo et al. |
| 2005/0119964 | A1 | 6/2005 | Brady et al. |
| 2007/0038523 | A1 | 2/2007 | Komem et al. |
| 2007/0100722 | A1 | 5/2007 | Ferguson et al. |
| 2007/0174181 | A1 | 7/2007 | Brummette et al. |
| 2007/0282726 | A1 | 12/2007 | Koester et al. |
| 2008/0147569 | A1 | 6/2008 | Kahan et al. |

FOREIGN PATENT DOCUMENTS

| | | |
|---|---|---|
| JP | 2002 318 910 | 10/2002 |
| WO | WO 96/34357 A1 | 10/1996 |
| WO | WO 03/107121 A2 | 12/2003 |

OTHER PUBLICATIONS

Basar, Shanny, Dark liquidity pools make a splash with US traders, Financial News Online US, Apr. 25, 2007, 4 pp., DowJones, *at* http://www.financialnews-us.com/INDEX.CFM?PAGE=USFEATURES&CONTENTID=2347636817 (last accessed Jun. 18, 2008).

Weidner, David, The secret stock market—"Dark pools" and other new-age exchanges rewrite the rules, under the radar, MarketWatch, May 14, 2007, 6 pp., *at* http://www.marketwatch.com/news/story/secret-stock-market-upstart-systems/story.aspx?guid=%7b11EB6EC9-6D71-43C9-ADD2-59C6B9E3C5D1%7d&print=true&dist=printMidSection (last accessed Oct. 8, 2008).

International Search Report for International Application No. PCT/US06/42158 mailed on Sep. 5, 2007.

Carol Alexander; Market Models: A Guide to Financial Data Analysis; Chapters 3-13 (John Wiley & Sons, Ltd. 2001 Chichester, New York, Weinheim, Brisbane, Singapore, Toronto).

\* cited by examiner

MODELING FINANCIAL INSTRUMENTS USING BID AND ASK PRICES

CROSS REFERENCE TO RELATED APPLICATIONS

This application is a divisional of U.S. application Ser. No. 11/263,508, filed Oct. 31, 2005.

FIELD OF THE INVENTION

The present invention concerns a method and system of modeling financial instruments using bid and ask prices. In particular, this method and system may allow for improved prediction of future bid and ask prices of financial instruments and may be used to provide information to make decisions for automated trading of various financial instruments.

BACKGROUND OF THE INVENTION

A fundamental analysis strategy is the investment in stocks on the basis of the value of the companies represented by the stocks. The company's balance sheet, income statement, etc., are studied to help determine the financial and market position of the company. If the analysis of the company's historic growth and profit patterns shows a steadily growing organization, and the research of the organization and its markets show a company that is competent and sound, a fundamental analysis approach may conclude that the company should continue to grow and prosper.

On the other hand, a technical analysis strategy involves trying to make profits based on the short-term swings of the market, such as, for example, day traders, who try to take advantage of hourly or daily price changes to make a profit. Slightly longer-term technical analysis investors track stock price and trading volume fluctuations over a period of a few days or weeks and trade on the basis of recent trends. As opposed to fundamental analysis where the emphasis is on the strength of the underlying corporation, technical analysis focuses on patterns that appear on the historical price charts of a specific stock and of the stock market in general in order to help predict the future of that stock's price. This strategy is based on the theory that certain patterns of stock prices tend to repeat themselves over time.

The Internet provides a great variety of uses including the buying and selling of financial instruments. The Internet has become a major means by which investors and brokers can both monitor the stock market and buy and sell stocks.

Although an investor does not need to be online to buy stocks, Internet access may be of great value. The Internet offers resources that are unmatched by any single print source. A wired investor can get access to literally thousands of investment services, publications, newsletters, and discussion groups. In this manner an investor can quickly gather a large amount of information about various financial instruments, including information about companies whose stock may be of interest.

The stock market includes a number of features that affect the stock investor. One of these features is the existence of agents to facilitate the functioning of the market. Market makers, specialists and Electronic Communications Networks (ECNs) make market in stocks. Market makers are part of the National Association of Securities Dealers market (NASD), and specialists work on the New York Stock Exchange (NYSE) and other listed exchanges. An ECN is an electronic board where buy and sell orders may be posted by any investor worldwide. These agents serve a similar function but there are a number of differences between them.

The New York Stock Exchange (NYSE) is the oldest stock exchange in the United States. The NYSE (as well as the Philadelphia, Chicago, Boston, and Pacific Stock Exchanges) uses an agency auction market system that is designed to allow the public to meet the public as much as possible. The majority of trading volume (approximately 90%) occurs with no intervention from the specialist. The responsibility of specialists is to make a fair and orderly market in the issues assigned to them. They must yield to public orders, which means that they may not trade for their own account when there are public bids and asks better than their own. The specialist has an affirmative obligation to eliminate imbalances of supply and demand when they occur. Specialists are required to make a continuous market. The exchange has strict guidelines for trading depth and continuity that must be observed. Specialists are subject to fines and censures if they fail to perform this function. NYSE specialists have large capital requirements and are overseen by Market Surveillance at the NYSE.

A specialist will typically maintain a narrow spread between offers to buy and offers to sell. Generally, the trader will need access to a professional's data feed before the trader can really see the size of the spread.

There are over a thousand NYSE members (i.e., seats), of which approximately a third are specialists. There are over 3000 common and preferred stocks listed on the NYSE. On the average, each specialist handles 6 issues. The very big stocks may have a specialist devoted solely to them.

Every listed stock has one firm assigned to it on the floor. Most stocks are also listed on regional exchanges in San Francisco, Chicago, Philadelphia and Boston. All NYSE trading (approximately 80% of total volume) occurs at that post on the floor of the specialist assigned to it.

The National Association of Securities Dealers Automated Quotation system (NASDAQ) is an interdealer market represented by over 600 securities dealers trading more than 15,000 different issues. These dealers are called market makers. Unlike the NYSE, the NASDAQ market does not operate as an auction market. Instead, market makers are expected to compete against each other by posting the best quotes (best bid, i.e., best offer to buy, and best ask, i.e., best offer to sell).

A NASDAQ Level II quotation system shows all the bid offers, ask offers, size of each offer (the order size), and the market makers making the offers. The order size is simply the number of shares the market maker is prepared to fill at that price. Since about 1985 the average person has had access to Level II quotes.

The Small Order Execution System (SOES) was implemented by NASDAQ following the 1987 market crash. This system is intended to help the small investor have his or her transactions executed without allowing market makers to take advantage of the small investor. The trader may see mention of "SOES Bandits" which is slang for people who day-trade stocks on the NASDAQ using the SOES, scalping profits on the spreads.

A firm can become a market maker on NASDAQ by applying to NASD. The requirements include certain capital requirements, electronic interfaces, and a willingness to make a two-sided market. The trader must be there every day. If the trader doesn't post continuous bids and asks every day the trader can be penalized and not allowed to make a market for a month. Market makers are regulated by the NASD, which is overseen by the SEC.

The brokerage firm can handle customer orders either as a broker or as a dealer/principal. When the firm acts as a broker, it simply arranges the trade between buyer and seller, and charges a commission for its services. When the firm acts as a dealer/principal, it's either buying for or selling from its own account (to or from the customer), or acting as a market maker. The customer is charged either a mark-up or a mark-down, depending on whether they are buying or selling. The firm is disallowed from charging both a mark-up (or mark-down) and a commission. Whether acting as a broker or as a dealer/principal, the brokerage is required to disclose its role in the transaction. However, dealers/principals are not necessarily required to disclose the amount of the mark-up or mark-down, although most do this automatically on the confirmation as a matter of policy. Despite its role in the transaction, the firm must be able to display that it made every effort to obtain the best posted price. Whenever there is a question about the execution price of a trade, it is usually best to ask the firm to produce a Time and Sales report, which allows the customer to compare all execution prices with the actual execution price reported to the customer.

In NASDAQ, the public almost always trades with the dealer as a counterparty instead of another public investor, making it nearly impossible to buy on the bid or sell on the ask. Dealers can buy on the bid even though the public is bidding at the same price. Despite the requirement of making a market, in the case of market makers as opposed to specialists, there is no one firm who has to take responsibility if trading is not fair or orderly, as what seemed to have happened during the crash of 1987. At that time, many NASD firms simply stopped making markets or answering phones until prices were less volatile.

Recently, Electronic Communication Networks (ECN) were established in order to allow investors to trade NASDAQ listed stocks without having to go through market makers, oftentimes resulting in better prices for the investor. An ECN is an electronic system where buy and sell orders may be posted by any investor worldwide, where any investor or dealer may trade against that order. The best bid and best ask orders from the ECN are posted in the NASDAQ system alongside those of market makers.

If a trader wants to buy or sell a financial instrument, such as a stock or other security, in an open market, the trader normally trades via firms who act as agents who specialize in that particular security. These firms stand ready to sell the trader a security at the asking price (the "ask"). Or, if the trader owns the security and would like to sell it, the agent buys the security from the trader at the bid price (the "bid"). The bid and the ask prices remain until a new price is set. The difference between the current bid and the current ask is called the spread. Financial instruments that are heavily traded tend to have very narrow spreads (e.g., a few cents), but financial instruments that are lightly traded may have spreads that are significant, even as high as several dollars.

The width of the spread is indicative of the financial instrument's liquidity. Liquidity basically measures the aggregate quantity investors are willing to buy or sell of the financial instrument at any time. In the stock market, market makers or specialists (depending on the exchange) buy stocks from the public at the bid and sell stocks to the public at the ask (called "making a market in the stock"). At most times (unless the market is crashing, etc.) these people stand ready to make a market in most stocks and often in substantial quantities, thereby maintaining market liquidity. Dealers earn profit by realizing a large part of the spread on each transaction—they normally are not long-term investors.

Two types of online trading available to the public are: Internet trading provided by firms that route a customer's order to a trading desk or to a third party willing to pay for order flow; and dedicated online services provided by firms where customer's orders go directly to the exchange or ECN offering direct execution.

If the online investor uses the first type of online trading discussed above, the customer's order may be gamed by a specialist or market maker handling the order. Unfortunately, if this happens to the customer, they may not be able to recognize that it has happened from the minimal information typically provided in the order confirmation. Typically, this type of customer only has access to what's called Level I data—the best bid, the best ask, the last trade, and the order size of each data respectively.

If the customer uses the second type of online trading discussed above (i.e., the order goes from the firm directly to the exchange), the customer most likely is looking at a NASDAQ Level II screen. This screen shows all the bid offers, ask offers, the recent trades, the size of each offer or trade, and the market makers and ECNs making the offers.

An online trader connected to a web site that has a screen that displays NASDAQ Level II data, may see the following information streaming continuously on the screen: all bid offers, all ask offers, all trades, the size of each offer or trade and the market maker or ECN making the offer. This data may be refreshed as often as ten times per second. Hence, many traders are continuously analyzing the data on their screen all day. Moreover, unless the trader has a prodigious memory and even then the information may arrive too quickly to be fully read, much less utilized by the trader. The more individual financial instruments monitored by the trader, the greater the difficulty in utilizing the flood incoming data. Thus, a lot of important information may escape notice. Additionally, impatience at waiting for the desired trading condition may cause the trader to make a trade at an inopportune moment. Thus, an automated means of analyzing this wealth of information is desirable.

The present invention involves methods of modeling financial markets and automating trades to take advantage of this plethora of bid and ask price data.

SUMMARY OF THE INVENTION

An exemplary embodiment of the present invention is a method and system for modeling an investment significant parameter of a financial instrument, using a computer. At least one series of historical bid prices of the financial instrument or historical ask prices of the financial instrument is provided. A financial model type that has at least one variable parameter is selected. The variable parameter(s) of the selected financial model type is initialized. The series of historical bid prices and/or historical ask prices is applied to the initialized financial model type to estimate the variable parameter(s).

Another exemplary embodiment of the present invention is a method and system for predicting future bid prices and/or future ask prices of a financial instrument, using a computer. A model of at least one of the bid prices or the ask prices of the financial instrument based on a set of historical quotes of the bid prices and/or ask prices is provided. At least one of a bid stream of the bid prices of the financial instrument or an ask stream of the ask prices of the financial instrument is selected based on which of the bid prices and/or ask prices of the financial instrument are modeled by the model. The selected bid stream and/or ask stream is applied to the model. The model is operated to predict at least one future bid price and/or future ask price of the financial instrument based on the applied bid and/or ask stream.

A further exemplary embodiment of the present invention is a method and system for performing automated trades of at least one financial instrument, using a computer. At least one future bid price or future ask price of each of the financial instruments is predicted. The future bid price and/or future ask price of each financial instrument is predicted using at least one of a bid stream of the bid prices of the corresponding financial instrument or an ask stream of the ask prices of the corresponding financial instrument. For each of the at least one financial instrument, the predicted future bid and/or ask price(s) are compared to at least one most recent bid and/or ask price of the corresponding financial instrument to determine quote trend data of the corresponding financial instrument. If the quote trend data of one of the financial instruments meets a buy criterion for that financial instrument, a buy order is automatically placed for the financial instrument; and if the quote trend data of one of the financial instruments meets a sell criterion for that financial instrument, a sell order is automatically placed for the financial instrument.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Exemplary embodiments of the present invention includes methods and system of modeling financial instruments to predict future prices of these financial instruments as part of exemplary technical analysis investment strategies. These exemplary technical analysis investment strategies may also include the automated placing of buy and sell orders for a portfolio including one or more different financial instruments. These financial instruments may include: stocks, bonds, commodities, currencies, equities, derivatives, and/or futures.

In technical analysis investment strategies, one important consideration is the type of financial model to use. A large number of different types of financial models have been created, such as: expert system models; linear analytic models; non-linear analytic models; chaotic models; neural network models; time delay neural network models; Markov-chain Monte Carlo models; wavelet transformation models; regression models; fractal models; support vector machine models; and Bayesian models. Specific applications of these types of financial models based on trade prices are known to those skilled in the art. For example, Carol Alexander describes a number of specific financial models in chapters 3-13 of MARKET MODELS: A GUIDE TO FINANCIAL DATA ANALYSIS (John Wiley & Sons, Ltd. (2001)).

Each model type includes at least one variable parameter that may be used to match the model to the behavior of the financial instrument. Potential variable parameters may include a numerical value, a string to be optimized, a logical value, a conditional rule, and/or a structural link. For example, in wavelet transformation models, the wavelet transform coefficients are variable parameters, while in expert system models and Bayesian models the variable parameters may include likelihood values and/or decision rules and in neural network models the links between nodes may used as variable parameters.

Additionally, each model type may present a number of advantages and a number of disadvantages when used to model the behavior of a financial instrument. For example, neural network models may take less time to build as compared to many other models, but because these models are essentially black boxes and not causal. Thus, if a neural network model diverges, it may be difficult to identify this divergence quickly as the exact process used to achieve the output is hidden. Still, the ability of neural network models to handle non-linear data make such models attractive for modeling financial instruments.

As another example, chaotic and fractal models may also be attractive for their ability to handle non-linear data, but errors in initial values of these models may lead to exponential divergence over time. Thus, chaotic and fractal models of the financial instrument may require monitoring and occasional re-initialization to maintain their accuracy. This re-initialization procedure typically does not pose a problem in modeling many financial instruments where a stream of new input data may be available to update the initialization almost continuously.

Other considerations for the technical analysis investor include the type of data to apply to the model and the type of data to be determined by the model. Many financial models have been created that utilize historic trade price data as input data.

Trade price data has seemed an obvious choice for the input data of a financial model. This data includes the actual prices paid for the financial instrument previously. Additionally, the amount of data is relatively tractable. As described above, NASDAQ Level II data for a stock may be refreshed as often as ten times a second, but the majority of these updates are due to changes in the bid and ask prices of the stock. Actual trades of the stock occur much less frequently. Thus, new trade prices are posted at a significantly lower rate.

Unfortunately, some trades take place at prices that are much higher or lower than might be expected. These unusual trade prices may be due to trade-specific concerns, such as gaining a controlling share in a company, tax issues, etc., that are not included in the model. If not removed from the input data, these unusual trade prices may significantly affect the accuracy of the financial model, but such outlying trades may be difficult to identify, particularly in a low trade volume financial instrument. Additionally, depending on the financial market, the trade prices may not be posted for period time after the trade occurs. Even in the tightly regulated stock market, there is typically a one to ten second delay before a trade price is posted. Depending on the volatility of the financial instrument, the effect of this delay of the technical analysis investor may range from a minimal issue to an extreme detriment.

In the exemplary embodiments of the present invention, the actual series of bid and/or ask prices of the financial instrument are among the data applied to the model. The bid and ask prices (quotes) provide a number of advantages as input data for a financial model. Unlike trade prices, which represent unique events, bid and ask prices represent a continuous, ongoing record of the market. At any given time, each financial instrument has one, and only one, current best bid price and one, and only one, current best ask price. These quotes remain valid until replaced by a new quote, at which time the old quote is no longer valid. Thus, because new quotes do not become effective until posted, access to new bid and ask prices is nearly instantaneous. This may allow a financial model based on streams of quotes to operate substantially in real time.

In a low trade volume financial instrument, the time between trades may be days or even longer, potentially leading to large fluctuations between consecutive trade prices and correspondingly large uncertainty for a technical analysis investor. The quotes may move numerous times between trades as potential buyers and sellers seek an appropriate deal, which allows exemplary embodiments of the present invention to more accurately predict investment significant parameters of financial instruments. Investment significant parameters may include any predictions that are desirable to formulate an investment strategy, for example: future trade prices; future bid prices; future ask prices; future spreads; fair market values (FMV) now and/or in the future; expected profit; changes in prices, spreads, FMV's, or profit between two times; rates of change in prices, spreads, FMV's, or profit; winners and losers; and buy/sell instructions. The same advantages may exist for high trade volume financial instruments as well, only on a different time scale.

Additionally, the bid prices and the ask prices of a given financial instrument tend to track one another, thereby maintaining a relatively constant spread for the financial instrument, as described above for stocks. Therefore using both the bid and ask prices in a model may simplify the identification of outlying bid and ask prices. For example, a sudden jump in the ask price which is not followed by a corresponding increase in the bid price to take advantage of the increased price the market is willing to pay is likely to indicate a misquote or other error. However, if the increased ask price is real, the bid price is likely to quickly follow. Thus, exemplary embodiments of the present invention also may allow technical analysis investors to track sudden changes in a financial instrument with greater certainty.

Figure 1:
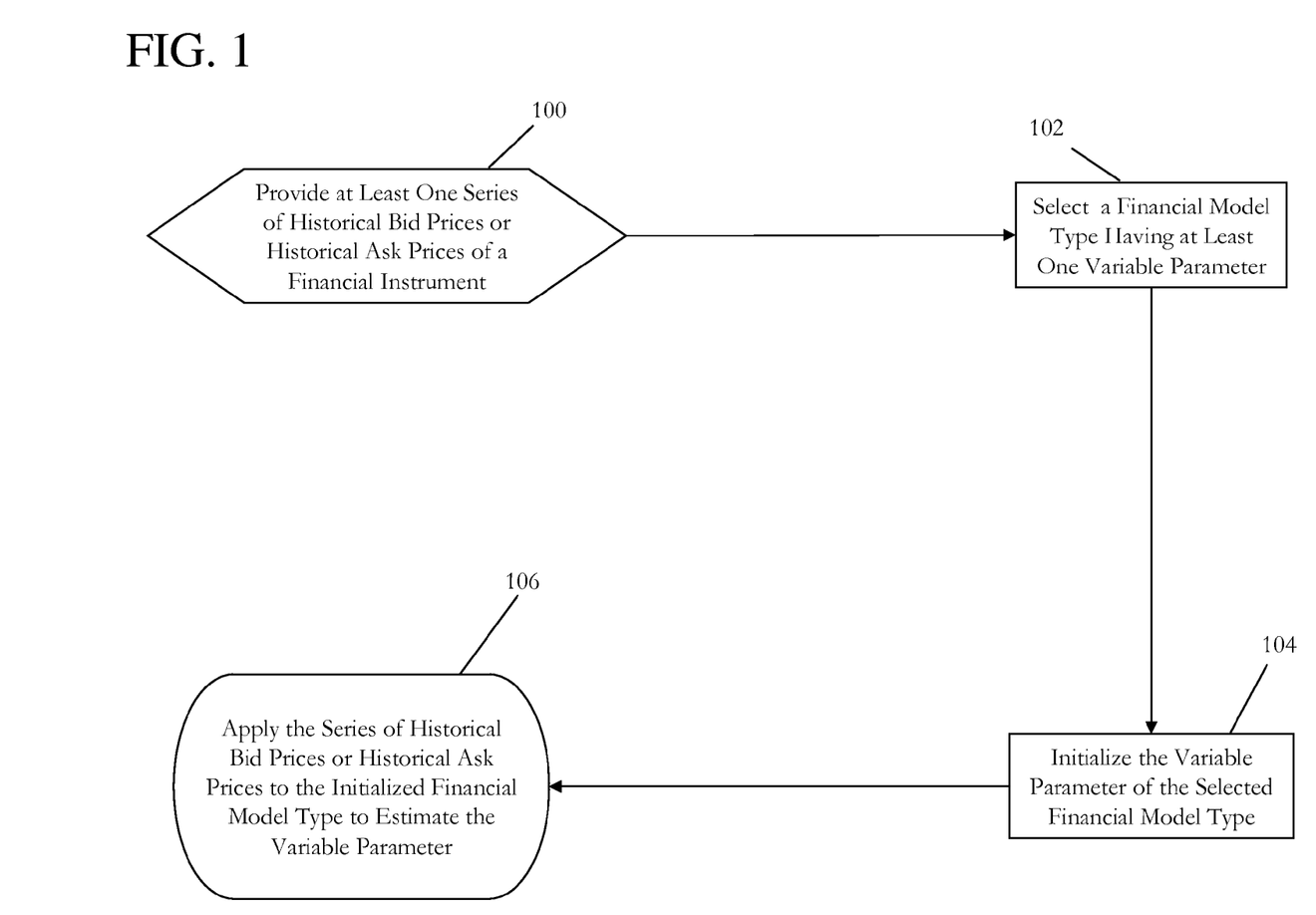
FIG. 1 is a flow chart illustrating an exemplary method and system of modeling an investment significant parameter of a financial instrument according to the present invention.

FIG. 1 illustrates an exemplary method for modeling an investment significant parameter of a financial instrument, using a computer, according to the present invention. The financial instrument may desirably be a publicly traded financial instrument, but this is not necessary. It may be any type of financial instrument including: a stock; a bond; a commodity; a currency; an equity; a derivative security, or a future.

At least one series of historical bid prices of the financial instrument or historical ask prices of the financial instrument is provided as training data to the model, step 100. The provided series of historical bid and/or ask prices of the financial instrument may desirably include corresponding bid or ask sizes, respectively, associated with the quotes. Additionally, the provided series of historical quotes may desirably be provided as time series of the historical bid and/or ask prices including corresponding bid or ask times, respectively. Further a series of historical spreads between the historical bid prices and the historical ask prices of the financial instrument may be provided as well.

It may also be desirable for the historical series of quotes to include at least one complete consecutive series of: historical bid and/or ask prices of the financial instrument spanning a predetermined period of time; or a predetermined number of historical bid and/or ask prices of the starting from a predetermined time.

Outlying quotes may desirably be removed from the provided series of historical quotes, including complete consecutive series, before the series is (are) applied to the model.

An exemplary method of removing outliers from the provided series of historical quotes uses the relative stability of the spread between bid prices and ask price of financial instruments discussed above. Time series of the historical bid prices of the financial instrument, including corresponding bid times, and the historical ask prices of the financial instrument, including corresponding ask times, are provided. A time series of the spread between the historical bid and ask prices is calculated from their historical time series. Outlier bids in the time series of the historical bid prices may be identified using the time series of the spread, as may outlier asks in the time series of the historical ask prices. Quotes that cause the spread to increase, or decrease, beyond certain thresholds that may vary from financial instrument to financial instrument, may indicate potential outliers. If the change in the spread is quickly corrected by a change in the same quote (e.g. an unusually large jump in the bid price is followed by a corresponding drop in the bid price), the quote in question may be identified as an outlier. Conversely, if the change in the spread is corrected by a change in the other quote (e.g. an unusually large jump in the bid price is followed by a corresponding jump in the ask price), the quote in question may indicate the beginning of a trend up or down in the value of the financial instrument. Once identified the outliers bid(s) and/or ask(s) and their corresponding bid or ask times are removed from the time series.

A financial model type is selected, step 102. As discussed above, numerous financial model types exist, each with its own advantages and disadvantages, depending on the financial instrument to be modeled. One skilled in the art may understand that each financial model type has at least one variable parameter that may be tuned to model the behavior of a particular financial instrument. The variable parameter(s) of the selected financial model type are initialized, step 104. This initialization may be based on a priori knowledge of the financial instrument and/or the selected financial model type, initial values of the series of historical quotes provided in step 100, a predetermined initial setting, or a combination of these methods.

The series of historical bid prices and/or historical ask prices are applied to the initialized financial model type as training data to estimate the variable parameter(s), step 106. In an exemplary embodiment of the present invention, the financial model type selected in step 102 is used to calculate at least one of a predicted bid price or a predicted ask price of the financial instrument. This calculation may be based on a set of historical quotes that includes a predetermined quantity of consecutive historical quotes from the series of historical bid prices and/or historical ask prices provided in step 100. The calculation may be repeated for each set of historical quotes to calculate a plurality of predicted bid prices and/or a plurality of predicted ask prices. These predicted quotes may then be compared to the series of historical quotes provided in step 100. The variable parameter of the selected financial model type is varied based on the differences between the predicted quotes and the series of historical quotes. The calculations and comparisons may be repeated until the variable parameter has been estimated and the behavior of the financial model matches the historical behavior of the financial instrument to within a predetermined degree of accuracy, i.e. the predicted quotes substantially correspond to the series of historical quote.

It is noted that the use of the training data provided in step 100 may depend on the type of financial model selected in step 102. For example, in a non-linear analytic model differences between the output of the model and the series of historical quotes may be used as feedback in an estimation maximization algorithm or other recursive algorithm to adjust the model parameters. In another example, time series of historical quote prices and corresponding quote times may be used as training data for a time delay neural network model of the financial instrument.

It is noted that other training data which may be provided in step 100, such as: a time series of the spread between the historical bid prices and the historical ask prices; a series of historical trade prices; and/or extrinsic data, including market indices or related financial instruments, may also be applied to the selected financial model type to improve the estimation of the variable parameter(s).

Figure 2:
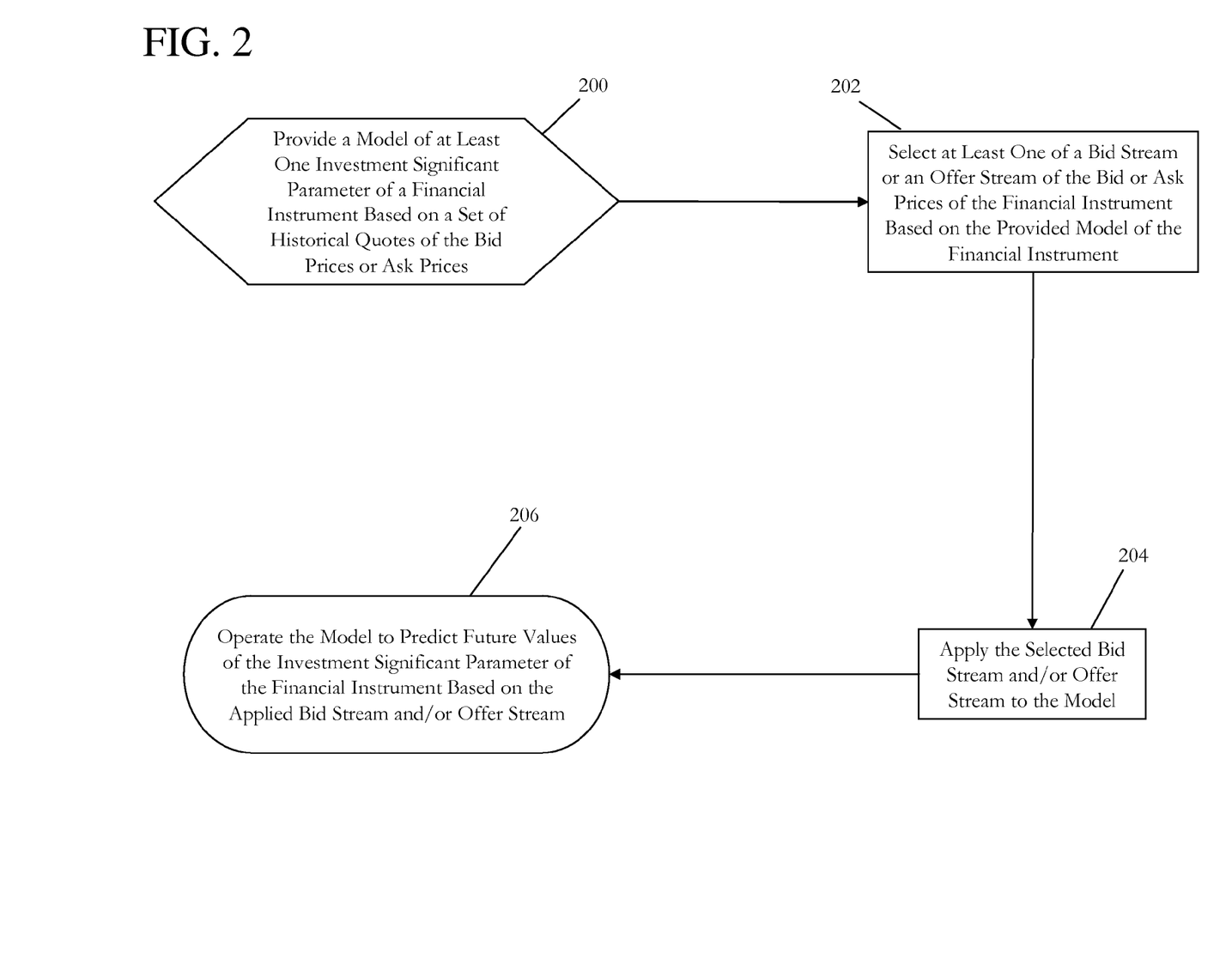
FIG. 2 is a flow chart illustrating an exemplary method and system of predicting future bid prices and/or future ask prices of a financial instrument according to the present invention.

FIG. 2 illustrates an exemplary method for predicting an investment significant parameter of a financial instrument, using a computer, according to the present invention. A model of the bid prices and/or the ask prices of a financial instrument, based on a set of historical quotes of the bid and/or ask prices, is provided, step 200. This model may be desirably generated using an exemplary method of FIG. 1 described above.

At least one of a bid stream of the bid prices of the financial instrument or an ask stream of the ask prices of the financial instrument is selected, step 202. This selection may desirably be based on whether the bid prices, the ask prices, or both of the financial instrument are modeled by the model provided in step 200. Although not necessary, for many financial instruments, particularly high trade volume financial instruments, it may be desirable for the quote stream(s) selected in step 202 to be a real time bid stream of the bid prices of the financial instrument and/or a real time ask stream of the ask prices of the financial instrument. This may allow for the model to predict, substantially in real time, at least one of future bid prices of the financial instrument or future ask prices of the financial instrument, allowing a technical analysis investor using an exemplary embodiment of the present invention to react substantially faster to changes in the financial market. Such improved reaction time may greatly increase the potential for profits by such an investor.

Desirably, the selected quote stream(s) may include the same variables as the series of historical data used for generating the model provided in step 200. For example, if a historical time series of the bid prices of the financial instrument, including corresponding bid times is used during generation of the model, then it is desirable for the quote stream selected in step 202 to be a bid stream of the financial instrument, including the bid prices and corresponding bid times. As another example, if a historical series of the ask prices of the financial instrument, including corresponding ask sizes is used during generation of the model, then it is desirable for the quote stream selected in step 202 to be an ask stream of the financial instrument, including the ask prices and corresponding ask sizes. Additionally, if other data is included with the series of historical data used for generating the model provided in step 200, such as: a time series of the spread between the historical bid prices and the historical ask prices; a series of historical trade prices; and/or extrinsic data, it is desirable for those types of data to be included with the quote stream(s) selected in step 202.

The selected quote stream(s) is (are) applied to the model, step 204. As discussed above with reference to the series of historical quotes used in the exemplary method of FIG. 1, it may be desirable to identify and remove outliers in the selected quote stream(s). If both bid and ask streams of the financial instrument, including corresponding bid and ask times, respectively, are selected in step 202, then a spread stream may be calculated and used to remove outlying quotes from the bid and ask streams before they are applied to the model. Such an exemplary method of identifying and removing outlying quotes is described above with reference to FIG. 1.

The model is operated on the selected quote steam(s) to predict at least one investment significant parameter of the financial instrument, step 206. If the selected quote stream(s) is (are) real time quote stream(s), then the model may desirably be operated to predict, substantially in real time, the desired future quotes, trade prices, FMV, or other stream of investment significant information about the financial instrument.

Whether these predictions are made substantially in real time or not, it may also be desirable for each of the predicted investment significant parameters to include a predicted time, for example future quotes of the financial instrument may desirably include a predicted quote time (i.e. a bid time or an ask time) associated with the predicted future quote. Desirably, the predicted time of each future investment significant parameter prediction may be within a predetermined period of time after prediction. If the predicted time is too close to the time that it is predicted, an investor using the exemplary method may not be able to use the information before it becomes stale, or if the predicted time is too remote, then it may be desirable for the model to hold the prediction until closer to the predicted time, in case new information arrives that may affect the prediction.

It is noted that such time predictions may not be available if the selected quote stream(s) only include(s) sequential quotes of the financial instrument without corresponding quote times. In this situation, the predicted future investment significant parameter(s) of the financial instrument may represent the next anticipated value of the trade, bid, and/or ask price of the financial instrument or a short-term buy/sell instruction, etc. For many technical analysis investors, this information may be adequate and removing the additional temporal variables may significantly simplify the model.

Another feature that may be desirable is a confidence level associated with each of the predicted investment significant parameter. Many financial model types include calculation of such confidence level. Thus, the model may desirably predict one or more future investment significant parameter of the financial instrument that includes a corresponding confidence level.

The model provided in step 200 may also be dynamically updated using the selected quote stream(s) as additional training data. The quotes of the quote streams may be used as additional historic quotes to continually refine the estimate(s) of the variable parameter(s) of the model using the exemplary method of FIG. 1.

Figure 3:
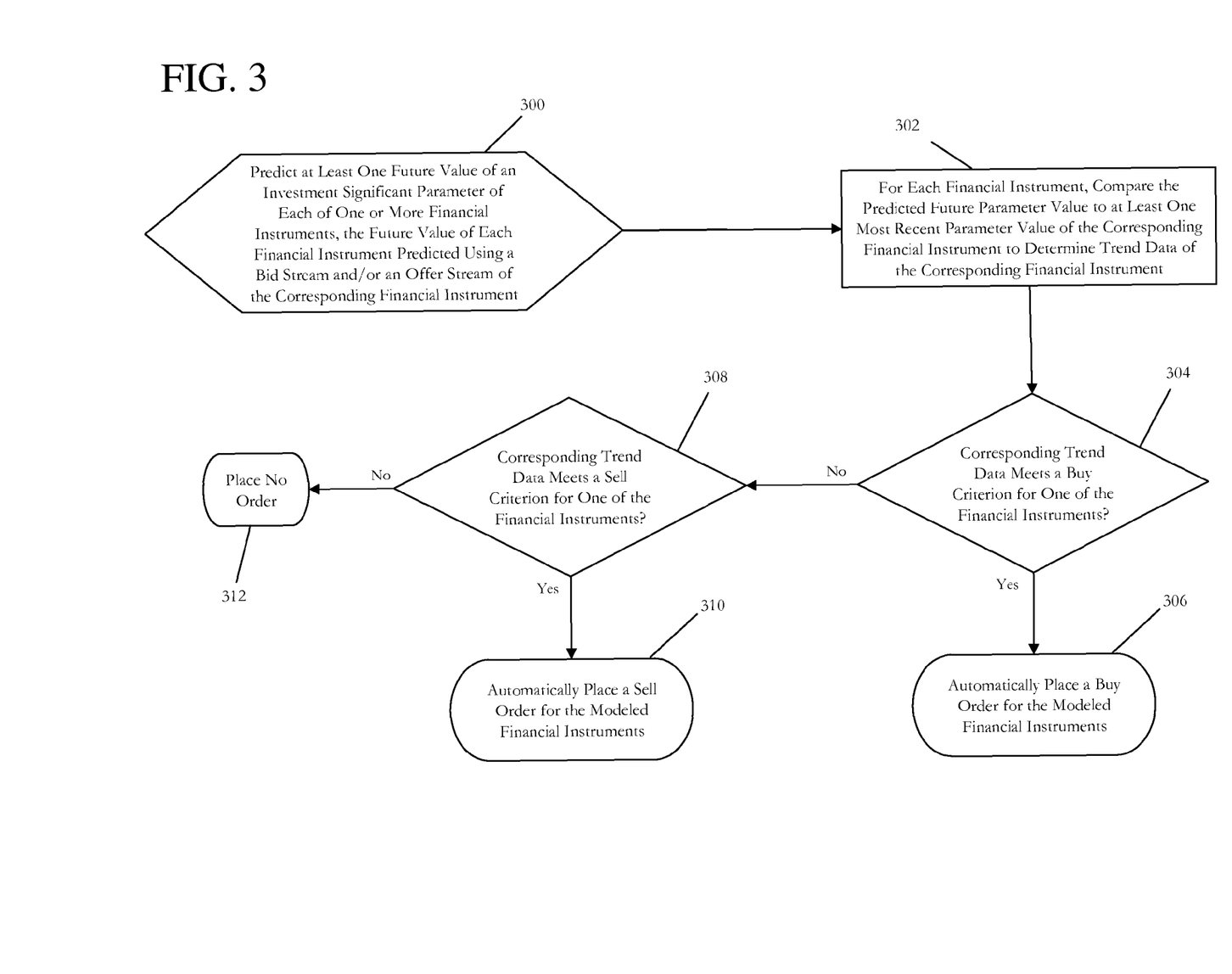
FIG. 3 is a flow chart illustrating an exemplary method and system of performing automated trades of at least one financial instrument according to the present invention.

FIG. 3 illustrates an exemplary method for performing automated trades of at least one financial instrument, using a computer, according to the present invention. The financial instrument(s) may be selected from a single type of financial instrument such as publicly traded stocks, for example, or may include a number of financial instruments selected from one or more types of financial instruments, such as stocks, bonds, commodities, currencies, equities, derivatives, and futures.

At least one investment significant parameter of each financial instrument is predicted, step 300. The predicted investment significant parameter(s) of each financial instrument are predicted using at least one of a bid stream of the bid prices of the corresponding financial instrument or an ask stream of the ask prices of the corresponding financial instrument. Desirably, the predicted investment significant parameter(s) may be determined using one or more of the exemplary methods of FIGS. 1 and 2 as described above. The quote stream(s) used may include real time quote streams of each financial instrument or may include some quote streams that are not provided in real time. As described above the predictions may utilize additional data, such as: spread streams for one or more of the financial instruments; trade price streams for one or more of the financial instruments; and/or extrinsic data, including market indices or related financial instruments.

Additional prediction information such as predicted times and corresponding confidence levels of each of the one or more corresponding investment significant parameter may be desirably provided as well for one or more of the financial instruments.

If the investment significant parameter(s) predicted in step 300 are numerical values, then, for each of the financial instruments, the predicted investment significant parameter(s) are compared to at least one of the most recent corresponding value(s) of the corresponding financial instrument to determine trend data of the corresponding financial instrument, step 302. If the predicted investment significant parameter(s) for a financial instrument include corresponding parameter confidence level(s), the trend data determined for the financial instrument may desirably include a corresponding trend confidence level based on the corresponding parameter confidence level. The buy criterion and the sell criterion for a given financial instrument may be varied based on its trend confidence level. Alternatively (or additionally), the trend confidence level(s) of the financial instrument(s) may be tracked to help determine when to place buy and/or sell orders.

If more than one financial instrument is being traded using the exemplary method of FIG. 3, then an exemplary joint trade strategy approach may be used to determine the trend data corresponding to each of the financial instruments in step 302. In this exemplary approach, for each of the financial instruments, the predicted investment significant parameter(s) are compared to at least one most recent corresponding value of the corresponding financial instrument to determine a predicted change in the predicted parameter of the corresponding financial instrument. The plurality of predicted changes in the predicted parameters determined may be analyzed to formulate a joint trade strategy for the financial instruments over a predetermined period time to maximize anticipated return. The trend data corresponding to each of the financial instruments may then be set based on the joint trade strategy.

One skilled in the art may understand that various algorithms may be used to analyze the plurality of predicted changes and formulate the joint trade strategy including: expert system models; linear analytic models; non-linear analytic models; chaotic models; neural network models; time delay neural network models; Markov-chain Monte Carlo models; wavelet transformation models; regression models; fractal models; support vector machine models; or Bayesian models.

The corresponding trend data of each financial instrument is compared to the buy criterion of that financial instrument, step 304. If the corresponding trend data of a financial instrument does not meet the corresponding buy criterion, then the trend data is compared to the sell criterion of that financial instrument, step 308. As described above the buy and/or sell criteria may be varied based on a trend confidence level of the financial instrument. Alternatively, these criteria may be predetermined, based on a priori knowledge of the financial instrument or financial market, or may be determined by the corresponding model of the financial instrument. Additional factors may also affect these criteria. For example, the amount of cash, or credit, available to purchase financial instruments may affect the buy criteria of the financial instrument and whether any quantity of a given financial instrument is owned may affect the sell criteria of that financial instrument.

It is noted that the order of steps 304 and 308 may be reversed, or these steps may be performed substantially simultaneously without departing from the present invention.

If the buy criterion is met in step 304 for a given financial instrument, then a buy order for that financial instrument is automatically placed, step 306. Likewise, if the sell criterion is met in step 308 for a given financial instrument, then a buy order for that financial instrument is automatically placed, step 310. If neither criterion is met, then no order is place for the given financial instrument, step 312.

When either a buy order is placed in step 306 or a sell order is placed in step 310, a buy size of the buy order or a sell size of the sell order may desirably be determined. The buy size may be set to a predetermined size, a predetermined total price, or may be based on the amount of cash, credit, and/or other liquid assets available for the purchase. The sell size may be set to a predetermined size, a predetermined total price, or may be based on the quantity of the financial instrument available for sale by the investor. If a corresponding trend confidence level has been determined, then the buy size of the buy order, or the sell size of the sell order, may be determined based on the corresponding trend confidence level.

Alternatively, a buy size and a sell size for each financial instrument may be determined based on a comparison of the trend data and the buy criterion of the financial instrument. A buy order is then automatically placed for each financial instrument for which the buy size is greater than zero and a sell order is automatically placed for each financial instrument for which the sell size is greater than zero.

If the investment significant parameter(s) predicted in step 300 are non-numerical values, e.g. buy/sell instructions and/or winner and loser predictions, then the predicted investment significant parameter(s) may be used directly to determine what trade orders should be placed. If the predicted investment significant parameter(s) for a financial instrument include corresponding parameter confidence level(s), then these parameter confidence level(s) may be used to determine the size of any trade orders that are to be placed. In the case where more than one financial instrument is being traded, the parameter confidence level(s) may be used to develop a joint trade strategy among the financial instruments that may include determining the size of any trade orders to be placed.

It is noted that both numerical and non-numerical investment significant parameters may be predicted by the exemplary model in step 300 of FIG. 3. In this situation, the investment significant parameters may be used in combination to determine a (joint) trade strategy. In determining a trade strategy in this manner, each investment significant parameter being given a weight in deciding whether to place buy or sell orders. Alternatively, different investment significant parameters may be used for different determinations, e.g. a buy/sell instruction may be used to determine whether to place an order to buy or sell the corresponding financial instrument and the predicted profit of each trade may be used to determine order sizes between several financial instruments.

The various exemplary embodiment of the present invention may be carried out through the use of a general-purpose computer system programmed to perform the steps of the exemplary methods described above with reference to FIGS. 1, 2, and 3. Exemplary general-purpose computer systems may include personal computers, work stations, distributed processing computer networks, and parallel processing computer systems. Parallel or distributed processing may be desirable for substantially real time applications involving the substantially concurrent prediction of future quotes for a plurality of financial instruments. Dedicated special-purpose computing systems may also be designed for performing exemplary methods of the present invention as well.

Additionally, it is contemplated that the methods previously described may be carried out within a general purpose computer system instructed to perform these functions by means of a computer-readable medium. Such computer-readable media include: integrated circuits, magnetic and optical storage media, as well as audio-frequency, radio frequency, and optical carrier waves.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for modeling an investment significant parameter of a financial instrument, using a computer, the method comprising the steps of:
   a) providing at least one series of historical bid prices of the financial instrument or historical ask prices of the financial instrument as training data;
   b) selecting a financial model type having at least one variable parameter for matching the selected financial model type to the behavior of the financial instrument;
   c) initializing the at least one variable parameter of the selected financial model type; and
   d) estimating the at least one variable parameter by applying the training data to the initialized financial model type with the computer to model the investment significant parameter of the financial instrument, wherein step (d) includes the steps of:
      d1) calculating a series of historical values of the investment significant parameter based on the at least one series of historical bid prices or historical ask prices provided in step (a);
      d2) using the financial model type selected in step (b) to calculate a predicted investment significant parameter, the calculation based on a set of historical quotes having a predetermined quantity of consecutive historical quotes of one of the at least one series of historical bid prices or historical ask prices provided in step (a);
      d3) repeating step (d2) for each set of historical quotes to calculate a plurality of predicted investment significant parameters;
      d4) comparing the plurality of predicted investment significant parameters to the series of historical values of the investment significant parameter;
      d5) varying the at least one variable parameter of the selected financial model type based on differences between the plurality of predicted investment significant parameters and the series of historical values of the investment significant parameter; and
      d6) repeating steps (d1), (d2), (d3), (d4), (d5), and (d6) until the plurality of predicted investment significant parameters calculated in steps (d2) and (d3) substantially correspond to the series of historical values of the investment significant parameter calculated in step (d1).

2. The method according to claim 1, wherein the financial instrument is a publicly traded financial instrument.

3. The method according to claim 1, wherein the financial instrument is one of a stock, a bond, a commodity, a currency, an equity, a derivative, or a future.

4. The method according to claim 1, wherein step (a) includes providing at least one complete consecutive series of:
   the historical bid prices of the financial instrument spanning a predetermined period of time;
   the historical ask prices of the financial instrument spanning the predetermined period of time;
   a predetermined number of the historical bid prices of the starting from a predetermined time; or
   the predetermined number of the historical ask prices of the starting from the predetermined time.

5. The method according to claim 1, wherein:
   step (a) includes providing at least one of:
      a time series of the historical bid prices of the financial instrument, including corresponding bid times; or
      a time series of the historical ask prices of the financial instrument, including corresponding ask times; and
   step (d) includes applying the at least one of the time series of historical bid prices or the time series of historical ask prices to the initialized financial model type to estimate the at least one variable parameter.

6. The method according to claim 1, wherein step (a) includes providing at least one of:
   the historical bid prices of the financial instrument, including corresponding bid sizes; or
   the historical ask prices of the financial instrument, including corresponding ask sizes.

7. The method according to claim 1, wherein step (a) includes the steps of:
   a1) providing a time series of the historical bid prices of the financial instrument, including corresponding bid times, and a time series of the historical ask prices of the financial instrument, including corresponding ask times;
   a2) calculating a time series of a spread between the historical bid prices and the historical ask prices of the financial instrument from the time series of the historical bid prices and the time series of the historical ask prices;
   a3) identifying outlier bids in the time series of the historical bid prices using the time series of the spread;
   a4) removing the identified outliers bids and corresponding bid times from the time series of the historical bid prices;
   a5) identifying outlier asks in the time series of the historical ask prices using the time series of the spread; and
   a6) removing the identified outliers asks and corresponding ask times from the time series of the historical ask prices.

8. The method according to claim 1, wherein step (a) includes the steps of:
   a1) providing a time series of the historical bid prices of the financial instrument, including corresponding bid times, and a time series of the historical ask prices of the financial instrument, including corresponding ask times; and
   a2) calculating a time series of a spread between the historical bid prices and the historical ask prices of the financial instrument from the time series of the historical bid prices and the time series of the historical ask prices; and
   step (d) includes applying the time series of the historical bid prices, the time series of the historical ask prices, and the time series of the spread between the historical bid prices and the historical ask prices to the initialized financial model type to estimate the at least one variable parameter.

9. The method according to claim 1, wherein step (b) includes selecting the financial model type to be one of: an expert system model; a linear analytic model; a non-linear analytic model; a chaotic model; a Markov-chain Monte Carlo model; a wavelet transformation model; a regression model; a fractal model; a support vector machine model; or a Bayesian model.

10. The method according to claim 1, wherein the investment significant parameter is one of: a future trade price; a future bid price; a future ask price; a future spread; a fair market value (FMV); an expected profit; a change in trade price between two times; a change in bid price between two times; a change in ask price between two times; a change in spread between two times; a change in FMV between two times; a change in profit between two times; a rate of change of trade price; a rate of change of bid price; a rate of change of ask price; a rate of change of spread; a rate of change of FMV; a rate of change of profit; a prediction of winners and losers; or a buy/sell instruction.

11. A method for modeling an investment significant parameter of a financial instrument, using a computer, the method comprising the steps of:
   a) providing at least one series of historical bid prices of the financial instrument or historical ask prices of the financial instrument as training data;
   b) selecting a financial model type having at least one variable parameter;
   c) initializing the at least one variable parameter of the selected financial model type; and
   d) estimating the at least one variable parameter by applying the training data to the initialized financial model type with the computer to model the investment significant parameters of the financial instrument, wherein the investment significant parameter is at least one of a future bid price or a future ask price; and step (d) includes the steps of:
   d1) using the financial model type selected in step (b) to calculate the at least one of a predicted bid price or a predicted ask price, the calculation based on a set of historical quotes having a predetermined quantity of consecutive historical quotes of one of the at least one series of historical bid prices or historical ask prices provided in step (a);
   d2) repeating step (d1) for each set of historical quotes to calculate at least one of a plurality of predicted bid prices or a plurality of predicted ask prices;
   d3) comparing the at least one of the plurality of predicted bid prices or the plurality of predicted ask prices to the at least one series of historical bid prices or historical ask prices;
   d4) varying the at least one variable parameter of the selected financial model type based on differences between the least one of the plurality of predicted bid prices or the plurality of predicted ask prices and the at least one series of historical bid prices or historical ask prices; and
   d5) repeating steps (d1), (d2), (d3), (d4), and (d5) until the at least one of the plurality of predicted bid prices or the plurality of predicted ask prices calculated in step (d1) and (d2) substantially correspond to the at least one series of historical bid prices or historical ask prices.

* * * * *